United States Patent
Voss

(10) Patent No.: US 6,926,981 B2
(45) Date of Patent: Aug. 9, 2005

(54) FUEL CELL SYSTEM FOR OPERATION AT PRESSURES BELOW THE PRESSURE OF THE SURROUNDING ENVIRONMENT AND METHOD OF OPERATION THEREOF

(75) Inventor: Henry Voss, West Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 270 days.

(21) Appl. No.: 10/306,190

(22) Filed: Nov. 27, 2002

(65) Prior Publication Data

US 2003/0118882 A1 Jun. 26, 2003

Related U.S. Application Data

(60) Provisional application No. 60/331,368, filed on Nov. 28, 2001.

(51) Int. Cl.[7] .............................. H01M 8/00; H01M 8/04
(52) U.S. Cl. ............................. 429/13; 429/22; 429/25
(58) Field of Search .............................. 429/13, 23, 25, 429/22

(56) References Cited

U.S. PATENT DOCUMENTS 3,438,814 A * 4/1969 White .......................... 429/25
3,558,361 A * 1/1971 White .......................... 429/17
5,366,818 A 11/1994 Wilkinson et al. ............ 429/13
6,106,964 A 8/2000 Voss et al. .................... 429/20

FOREIGN PATENT DOCUMENTS

JP 11-339832 12/1999

* cited by examiner

Primary Examiner—Patrick Joseph Ryan
Assistant Examiner—Thomas H. Parsons
(74) Attorney, Agent, or Firm—Seed IP Law Group PLLC

(57) ABSTRACT

In the present fuel cell systems, fuel cell stacks operate on a fuel stream having a pressure that is below the pressure of the surrounding environment, for example below atmospheric pressure. In the event of a leak, the fuel stream will not escape to the surrounding atmosphere, but rather gases from the surrounding environment will leak into the fuel stream. The fuel stream generally cannot exit the fuel cell stack during normal operation. The fuel cell stack may be periodically purged by increasing the pressure of the fuel stream above the pressure of the surrounding environment and by permitting exit through the fuel stream outlet. A monitoring device can be employed to determine when to purge the fuel cell stack.

33 Claims, 1 Drawing Sheet

FUEL CELL SYSTEM FOR OPERATION AT PRESSURES BELOW THE PRESSURE OF THE SURROUNDING ENVIRONMENT AND METHOD OF OPERATION THEREOF

CROSS-REFERENCE TO RELATED APPLICATION(S)

This application is related to and claims priority benefits from U.S. Provisional Patent Application Ser. No. 60/331,368, which was originally filed on Nov. 28, 2001, as a U.S. non-provisional patent application, assigned Ser. No. 09/995,906, and was converted to a U.S. provisional patent application in a Decision on Petition issued by the U.S. Patent and Trademark Office on Feb. 25, 2002. The '368 provisional application is hereby incorporated by reference herein in its entirety.

FIELD OF THE INVENTION

The present invention relates to electrochemical fuel cell systems and methods of operating fuel cell systems on fuel streams at pressures below the pressure of the surrounding environment. In particular, fuel cell systems and methods of operation are provided to improve fuel cell safety and reduce or eliminate leakage of fuel to the surrounding environment.

BACKGROUND OF THE INVENTION

Electrochemical fuel cells convert reactants, namely fuel and oxidant streams, to generate electric power and reaction products. Electrochemical fuel cells employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

During operation of a solid polymer electrolyte fuel cell, a fuel stream is supplied to the anode of the fuel cell and is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

Solid polymer fuel cells typically employ a membrane electrode assembly ("MEA") comprising a solid polymer electrolyte or ion exchange membrane disposed between two electrode layers. The membrane is an ion conductive (typically proton conductive) material and acts as a barrier for isolating the fuel and oxidant streams from each other.

The MEA is typically interposed between two separator plates, which are substantially impermeable to the fuel and oxidant streams. The separator plates act as current collectors and provide support for the MEA.

In a fuel cell stack, a plurality of fuel cells are connected together, typically in series, to increase the overall output power of the assembly. A fuel cell stack typically includes fuel inlet(s) and fuel supply manifold(s) for directing the fuel to the plurality of anodes and oxidant inlet(s) and oxidant supply manifold(s) for directing the oxidant to the plurality of cathodes. The fuel passage extends from the fuel inlet(s) to the fuel outlet(s) and transverses the anodes. The stack often also includes a coolant inlet and coolant supply manifold for directing a coolant fluid to interior passages within the stack to absorb heat generated by the exothermic reaction in the fuel cells. The stack also generally includes fuel exhaust manifold(s) and fuel outlet(s) for expelling the unreacted fuel gases, and oxidant exhaust manifold(s) and oxidant outlet(s) for expelling the unreacted oxidant and reaction products as well as a coolant exhaust manifold and coolant outlet for the coolant stream exiting the stack. The stack manifolds, for example, can be internal manifolds, which extend through aligned openings formed in the separator layers and MEAs, or can comprise external or edge manifolds, attached to the edges of the separator layers.

Conventional fuel cell stacks are sealed to prevent leaks of reactants to the surrounding environment and to prevent inter-mixing of the fuel and oxidant streams. Fuel cell stacks typically employ fluid tight resilient seals, such as elastomeric gaskets between the separator plates and membranes. Such seals typically circumscribe the manifolds and the electrochemically active area of the MEA. Sealing is affected by applying a compressive force to the resilient gasket seals.

The operation of a hydrogen fuel cell system creates a concern about fuel leakage from the fuel cell stacks. Hydrogen is a combustible fuel, and from a safety perspective, it is desirable to control or reduce the leakage of hydrogen to the surrounding environment. Various measures can be taken to reduce the risk of loss of fuel to the exterior of the fuel cell, including visual inspection of the fuel cell system, and gas leak detectors and cell voltage monitoring to determine if fuel is lost from the system. Each of these approaches facilitates the detection of a gas leak, but does not prevent the release of hydrogen to the surrounding environment if a leak occurs. Additional steps are usually needed and taken to stop the leak once it is detected. Furthermore, the fuel that leaks from the system is difficult if not impossible to recover.

Other techniques have been contemplated to watch for leakage of fuel across the membrane. For example, oxidant temperature sensors have been suggested for use in the oxidant exhaust to shut down the fuel cell and sound an alarm in the event of an abnormal rise in temperature, which could occur from combustion within the fuel cell.

The fuel stream supplied to the anode typically comprises hydrogen or is reformed to convert at least a portion to hydrogen. For example, the fuel stream can be a gas such as substantially pure hydrogen or a reformate stream containing hydrogen. Alternatively, a liquid fuel stream such as aqueous methanol can be employed. The oxidant stream, which is supplied to the cathode separator plate, typically comprises oxygen, such as substantially pure oxygen, or a dilute oxygen stream such as air.

Fuel outlets and oxidant outlets are not invariably necessary, or need not invariably be open. U.S. Pat. No. 5,366,818 describes fuel cell designs and operating conditions that permit the removal of accumulated water within the fuel stream exiting the fuel passage through a fuel outlet port. Water removal through the fuel outlet port permits the operation of a fuel cell in a "dead-ended" mode on the oxidant side that is, with a closed oxidant outlet port. That is, the oxygen-containing oxidant stream can be fed to the cathode and consumed substantially completely, producing essentially no outlet stream from the cathode.

U.S. Pat. No. 6,106,964 discloses that a solid polymer fuel cell typically has both a fuel exhaust stream and an oxidant exhaust stream exiting the fuel cell via fuel and oxidant exhaust ports, however one of the reactant passages can be essentially dead-ended with optional intermittent venting of inert components.

A fuel cell system, as used herein, refers to a fuel cell or a fuel cell stack and various external apparatus, equipment or components associated with the fuel cell or fuel cell stack. Fuel cell systems are currently being developed for use as power supplies in numerous applications, such as automobiles and stationary power plants. Such systems offer promise of economically delivering power with environmental and other benefits.

The performance of the fuel cell or fuel cell stack typically increases with increasing pressure of the reactants. As reactant pressure increases, the power density of the fuel cell increases. Most fuel cell stacks are supplied with fuel streams and oxidant streams at a relatively high pressure, for example greater than atmospheric pressure. The pressure is selected to provide the desired fuel cell performance, which generally is the maximum power output that can be obtained from the fuel cell stack. Previously, it has been supposed that proton exchange membrane fuel cells should operate on fuel streams supplied at pressures of 10 psig to 65 psig, although higher and lower pressures may have also been contemplated.

It is therefore advantageous to reduce or eliminate leakage of fuel from a fuel cell to the surrounding environment. In particular, it is desirable from a safety perspective to provide a method for operating a fuel cell that reduces the leakage of hydrogen from the fuel cell, rather than detecting the hydrogen that leaks during operation and thereafter reacting to the detected leak.

SUMMARY OF THE INVENTION

In one aspect, a fuel cell stack is operated on a hydrogen-containing fuel stream supplied at a pressure below the pressure of the surrounding environment. The power output of such a fuel cell stack will be adequate for many applications. The risk of hydrogen leakage to the environment is reduced by providing a fuel stream at a pressure below the pressure of the surrounding environment, and by operating a fuel cell stack on such a fuel stream. This present fuel cell system is advantageous from a safety perspective because it addresses hydrogen leakage in a preventative fashion rather than a reactive fashion.

An improved fuel cell system comprises a fuel cell stack adapted to operate on a fuel stream, the fuel cell stack comprising a fuel stream inlet that receives the fuel stream. The fuel cell system also comprises a fuel supply that provides the fuel stream to the fuel cell stack. The fuel cell system further comprises a pressure control mechanism for controlling the pressure of the fuel stream supplied to the fuel cell stack. The pressure control mechanism is disposed between the fuel supply and the fuel stream inlet. The pressure control mechanism has a setting at which the fuel stream is supplied at a pressure below the pressure of the surrounding environment.

In some embodiments, the pressure control mechanism does not have a setting at which the fuel stream is supplied at a pressure above the pressure of the surrounding environment; in other words, those fuel cell systems will always receive a fuel stream at a pressure lower than the pressure of the surrounding environment.

The pressure control mechanism sets the pressure of the fuel stream supplied to the fuel cell stack, and it can increase or decrease the pressure so that the pressure is above or below a pressure value. The pressure value can be a predetermined value, such as the expected pressure of the surrounding environment. Alternatively, the pressure value can be measured, such as by a pressure monitor that measures the pressure of the surrounding environment. The pressure control mechanism can have a lower setting which is lower than the measured pressure or expected pressure of the surrounding environment, and the fuel cell stack can typically operate with the pressure control mechanism at the lower setting.

When the fuel stream may include a diluent, the fuel cell system can comprise a monitoring device for monitoring a characteristic indicative of the concentration of the diluent in the fuel stream at a location in the fuel cell stack, such as at the last fuel cell in a dead-ended fuel cell stack. For example, the monitoring device can be a device for monitoring the voltage of a monitored fuel cell. Any suitable means for monitoring the concentration of a diluent in at least a portion of the fuel cell stack can be employed.

The fuel cell system can also comprise a controller for periodically adjusting the pressure control mechanism in response to a monitored characteristic. The controller can be programmed to adjust the pressure control mechanism to increase the pressure of the fuel stream supplied to the fuel cell when a certain control value is detected at a monitored fuel cell, for example, a certain voltage of the monitored fuel cell. The control value can be determined during operation of the fuel cell, or the control value can be a "predetermined" value that is, a value selected before operation of the fuel cell.

The fuel cell system can also comprise a purging mechanism for purging the diluent from at least a portion of the fuel cell stack. Any suitable means for occasionally purging at least a portion of the fuel cell stack can be employed. For example, the pressure control mechanism can have a purging setting at which the fuel stream is supplied at a pressure above the pressure of the surrounding environment. At this setting the fuel stream, including accumulated diluents, can be forced out of the fuel cell stack or a portion thereof. Appropriate precautions can be taken during purging so that any purged hydrogen is exhausted in a safe manner.

The fuel cell stack can further comprise a fuel stream outlet, and the controller can be programmed to adjust the fuel stream outlet to exhaust the fuel stream from the fuel cell stack in response to a control value of the monitored fuel cell. The fuel cell system can comprise a pump operatively connected to the fuel cell stack for exhausting the fuel stream in order to purge diluent from the fuel cell stack or a portion thereof.

The controller can be programmed to adjust the fuel stream outlet and/or pump to exhaust the fuel stream from the fuel cell stack in response to a control value of the monitored characteristic. As another option, the controller can be programmed to adjust the pressure control mechanism and the fuel stream outlet and/or a pump substantially simultaneously in response to a control value of the monitored characteristic.

An improved fuel cell system can comprise means for introducing a fuel stream to a fuel cell stack; a fuel supply which provides the fuel stream to the fuel cell stack through a fuel stream inlet; and means for limiting the pressure of the fuel stream supplied to the fuel cell stack to a pressure below the pressure of the surrounding environment. The improved fuel cell system can also comprise means for occasionally purging the diluent from at least a portion of the fuel cell stack. In some preferred embodiments, the fuel cell system will comprise means for monitoring the concentration of a diluent in at least a portion of the fuel cell stack and means for selectively purging the diluent from the portion of the fuel cell stack in response to the means for monitoring.

In another aspect, a method is provided for operating a fuel cell adapted to operate on a fuel. The method comprises the step of providing to the fuel stream inlet a fuel stream comprising a fuel at a pressure below the pressure of the surrounding environment. Where the fuel stream may include a diluent, the method can also comprise the step of occasionally purging a portion of the fuel cell stack. By purging the portion of the fuel cell, the diluent is removed from the fuel cell stack.

The present method can also comprise the steps of monitoring the concentration of the diluent within at least a portion of the fuel cell stack, and purging the portion in response to the monitored concentration.

The step of occasionally purging can comprise increasing the pressure of the fuel stream provided to the fuel stream inlet and permitting the fuel stream to exit the fuel cell. The fuel stream pressure can be increased to a pressure greater than the pressure of the surrounding environment. As mentioned above, appropriate precautions can be taken during purging. After purging, the fuel stream can be returned to a pressure below the pressure of the surrounding environment.

The purging step can comprise withdrawing the gaseous and/or liquid contents of the portion of the fuel cell stack through the fuel cell inlet or the fuel stream outlet, and/or withdrawing the contents of the portion of the fuel cell stack by operation of a vacuum pump.

The method can also comprise the step of measuring the pressure of the surrounding environment, and the step of adjusting the pressure of the fuel stream in response to the measured pressure of the surrounding environment.

DETAILED DESCRIPTION OF THE PREFERRED EMBODIMENTS

Figure 1:
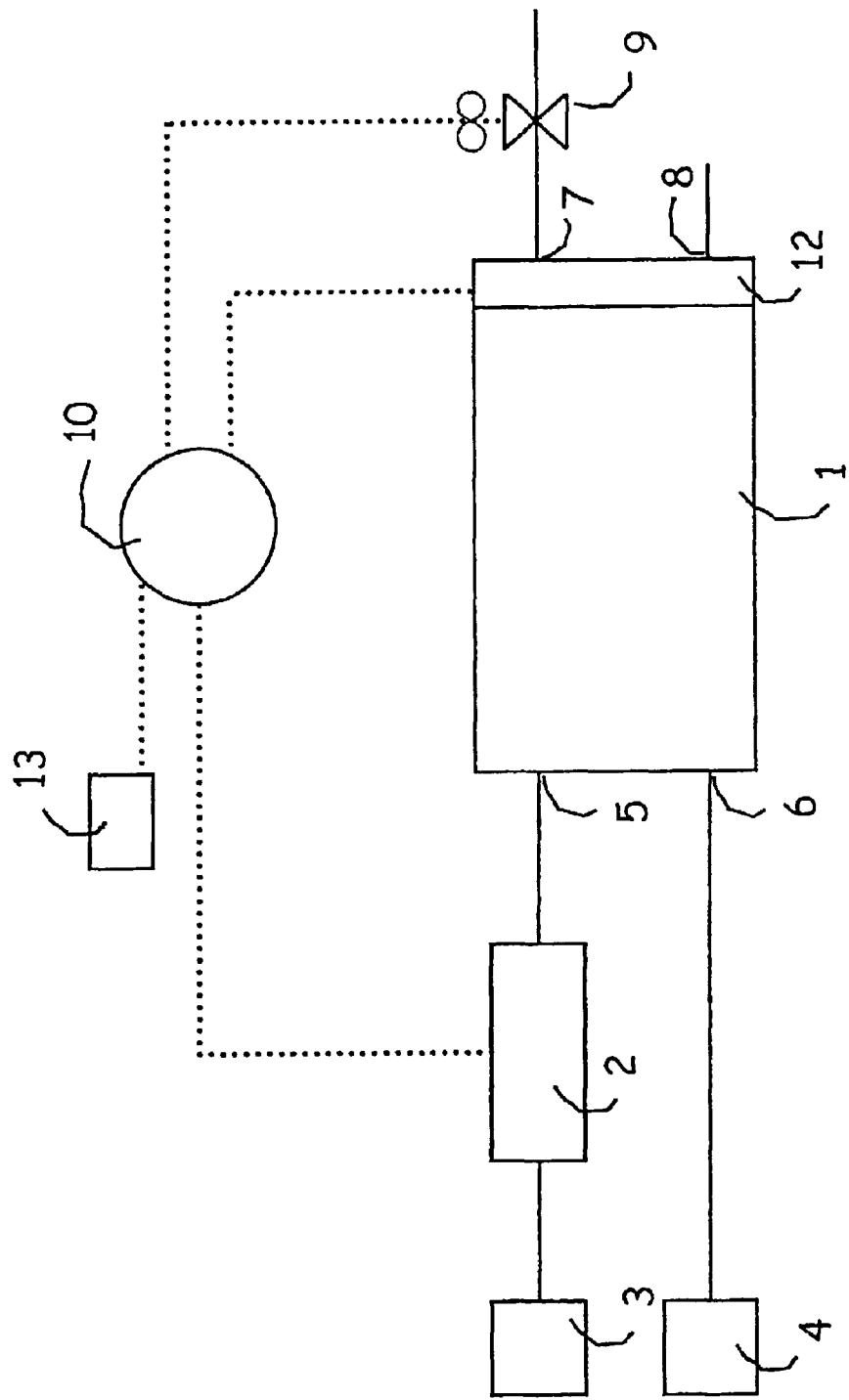
FIG. 1 is a schematic diagram of an embodiment of the present fuel cell system.

Gases will naturally flow from a high-pressure region to low-pressure region. The present fuel cell systems and methods employ this principle to minimize the loss of fuel due to leaks in the fuel cell system. In the event of a leak in the fuel cell stack, gas from the surrounding environment, for example ambient air, will mainly leak into the fuel stream rather than fuel leaking out of the fuel cell stack. This is achieved in the present method and fuel cell systems by supplying the fuel cell stack with a fuel stream at a pressure that is lower than the pressure of the surrounding environment. The fuel stream can be supplied to a fuel cell stack at a pressure below atmospheric pressure, which is generally about 14.7 pounds per square inch (psi) (about 100 kPa) at the Earth's surface.

The fuel stream employed in a fuel cell typically contains high amounts of hydrogen, and hydrogen is relatively combustible, so it is desirable to minimize leakage to the surrounding environment. The present methods and fuel cell systems are advantageous from a safety perspective in that they reduce the risk of hydrogen leakage and they address the issue in a preventative rather than a reactive fashion. It is preferable for ambient air to leak into the fuel cell stack than for the fuel stream to leak into the surrounding environment. Even if ambient air leaks into the fuel stream, the hydrogen or other fuel can still be recovered and used.

Nonetheless, the presence of air in the fuel stream will cause the cell voltage to drop, which can provide an indication of a leak, which can then be addressed. This can obviate a need for an external hydrogen leak sensor. Furthermore, in fuel cell systems operated at higher pressures, a slight leak of hydrogen to the surrounding environment would not necessarily result in a significant voltage drop to provide an indication of a leak.

The fuel stream usually contains component(s) other than the fuel itself, referred to herein as "diluent(s)". Such diluents are generally undesirable but can be difficult to eliminate from a fuel stream. For example, when the fuel stream is a hydrogen-containing stream provided from a hydrocarbon reformer, the fuel stream will contain diluents in the form of hydrocarbons and reaction products in addition to hydrogen.

With the fuel stream at a lower pressure than the surrounding environment, gases from the surrounding environment (typically air) will mainly leak into the fuel stream if there is a leak in the fuel cell system, rather than fuel leaking into the surrounding environment.

The present fuel cell systems and methods can also comprise occasionally purging at least a portion of the fuel cell stack. For example, the present methods and fuel cell systems can be designed to supply the fuel stream at a pressure greater than that of the surrounding environment, for example at super-atmospheric pressure, when purging the fuel cell of diluent. At a time when purging is desirable, the pressure of the fuel stream is increased above that of the surrounding environment, and the fuel stream is permitted to exit the fuel cell through a fuel stream outlet.

"Occasionally purging" means that the portion of the fuel cell stack is purged intermittently on various occasions during the operational life of the fuel cell stack, and it can be done on a regular or irregular basis. Occasional purging is desirable when the fuel cell stack has a dead-ended fuel passage.

A preferred embodiment of a fuel cell system equipped to provide a fuel stream at different pressures to the fuel cell stack in the system is shown in the schematic diagram of FIG. 1. The system comprises a solid polymer fuel cell stack 1. The stack 1 is supplied with a fuel stream from a fuel supply 3, which may or may not be packaged as part of the fuel cell system itself. The fuel supply 3 provides a fuel stream to the fuel cell stack 1. The pressure at which the fuel stream is supplied to the fuel cell stack 1 is controlled by the pressure control mechanism 2. Suitable pressure control mechanisms include adjustable valves, and pressure regulators. In the present embodiment, the pressure control mechanism 2 has at least two controllable settings: a lower pressure setting corresponding to a pressure below the expected pressure of the surrounding environment, and a higher pressure setting corresponding to a pressure above the expected pressure of the surrounding environment. The fuel stream is supplied to the fuel stream inlet 5 of the fuel cell stack 1. A supply of oxidant 4 (for example, compressed or forced air) is supplied to the oxidant inlet 6 of the fuel cell stack 1. The oxidant stream and reaction products such as water are exhausted at oxidant outlet 8.

In this embodiment, the fuel cell stack comprises a fuel stream outlet 7 and an exhaust valve 9. The fuel stream outlet 7 allows the fuel stream (in other words, unreacted fuel and/or diluent gases) to exhaust from the fuel cell stack. An exhaust valve 9 is disposed at the fuel stream outlet 7 and is normally closed. During normal operation of the fuel cell stack, the fuel stream outlet 7 does not permit the fuel stream to exit the fuel cell stack 1, so that the fuel passage is dead-ended. As used herein, "normal operation" for a given fuel cell refers to power generating operation and excludes irregular periods such as purging and malfunction.

One type of monitoring device is a monitoring cell, which is a fuel cell or group of fuel cells within a stack whose voltage is monitored. The monitored voltage can be employed as an indicator of diluent gas concentration in that cell or group. As the concentration of diluent(s) increases at the monitoring cell, the monitoring cell will display a lower voltage than it did earlier in the cycle and/or a lower voltage than the other fuel cells in the stack.

As depicted in FIG. 1, the fuel cell system also comprises a monitoring cell 12 whose voltage output or performance is dependent on the concentration of fuel present. The concentration of fuel, in turn depends on the concentration of diluent that has accumulated, since the presence of diluents dilutes the concentration of fuel in the fuel stream present at the monitoring cell. The monitoring cell 12 is a suitable monitoring device, although other monitoring devices can be employed, such as concentration sensors. The monitoring cell 12 is preferably situated within the fuel cell stack 1, preferably as the last cell along the fuel passage in the fuel cell stack. Thus, the monitoring cell 12 effectively monitors the diluent gas level in the fuel passage of the fuel cell stack 1. The voltage of the monitoring cell 12 is then used as an input signal to the controller 10.

The controller 10 controls the pressure of the fuel stream supplied to the fuel cell stack by providing an output signal to the pressure control mechanism 2. The controller 10 may be a computer, microprocessor, programmable logic controller, or any suitable apparatus for receiving a signal from a monitoring device. The same controller 10 (or another controller (not shown) receiving a signal from the monitoring device 12) may control the opening and closing of the exhaust valve 9 so that the fuel stream outlet 7 is effectively opened or closed.

In the present fuel cell systems, cascaded fuel manifolding can be employed, in which the fuel stream flows through the fuel cell stack along the fuel passage in a series manner to the last cell in the stack. In other words, a fuel stream is supplied by a manifold to a first fuel cell in the stack, travels the entire course of the first fuel cell before entering the second fuel cell, and so on until reaching the last fuel cell of the stack. Preferably, partially cascaded fuel manifolding is used in the present fuel cell systems, in which the fuel stream flows in parallel through a first set of fuel cells in the stack, and thereafter flows through a second set of fuel cell(s) in the stack. Partially cascaded fuel manifolding results in parallel as well as serial flow of the fuel stream through various fuel cells in the stack. By way of example, in one preferred arrangement, the fuel stream flows in parallel through a first set of about 40 fuel cells in a stack, then flows through a second set of about 2 fuel cells, and then flows through a third set of about 2 fuel cells.

In the present fuel cell systems, the fuel passage can be normally closed or "deadended", in that the fuel stream is not permitted to exit the fuel passage of the fuel cell stack. Optionally the fuel cell stack may comprise a fuel stream outlet, and the fuel stream may be recirculated such that some or all of the exhaust from the fuel stream outlet is included with the fuel stream fed to the fuel cell inlet. When the exhaust is recirculated, into the fuel stream, the fuel stream generally will still be supplied at a pressure lower than the pressure of the surrounding environment. The recirculated fuel stream may be pressurized as part of a purging step.

The diluents in the fuel stream will accumulate in a dead-ended fuel passage, thereby reducing the overall concentration of hydrogen and reducing the gradient of hydrogen ions. This reduced gradient will reduce the transfer efficiency of hydrogen ions across the membrane, thus leading to reduced cell voltage and reduced production of power. Therefore, it is desirable to occasionally purge the fuel stream from the fuel cell stack, so that the accumulated diluents are expelled from the fuel cell stack. Purging may be done at regular or irregular intervals, and/or may be done in response to a monitored characteristic of the fuel cell.

In preferred embodiments, when the voltage of the monitoring cell 12 falls below a lower threshold voltage limit (in other words, below a control value, the controller 10 will send a signal to a purging mechanism that causes the fuel stream to be purged from the fuel cell stack. In one method of purging, the controller 10 sends a signal to the pressure control mechanism 2 that will increase the pressure of the fuel stream to super-atmospheric pressure (or at least greater than the pressure of the surrounding environment).

In another method of purging, the controller 10 sends a signal to a vacuum pump (not shown in FIG. 1) which, when operated, withdraws the contents of the fuel stream in the fuel cell stack, thereby purging it of diluent. If a vacuum pump is used, the pressure of the fuel stream need not be adjusted. In such a method, the controller 10 need not control the pressure of the fuel stream; instead the pressure of the fuel stream may be passively set with respect to ambient pressure, for example, by the use of a conventional gas regulator.

In either of the above methods, the controller 10 may also send a signal to an exhaust valve 9, so that the fuel passage of the fuel cell stack is temporarily open-ended. As the diluent(s) exhaust, their concentration at the monitoring cell 12 decreases and the cell voltage of the monitoring cell 12 increases. Once the voltage of the monitoring cell 12 rises above an upper threshold voltage limit, as observed by the controller 10, a second output signal is sent to the pressure control mechanism 2, which returns the fuel stream pressure to lower than the pressure of the surrounding environment. The controller 10 can send a signal to instruct the exhaust valve 9 to close. Once the exhaust valve 9 is closed, diluent begins accumulating, and cell voltage of the monitoring cell 12 again decreases until it reaches the lower threshold voltage limit and the cycle repeats itself.

When the monitoring cell 12 indicates diluent is to be exhausted, the fuel pressure is increased to super-atmospheric pressure. Other methods can be employed to determine the concentration of the gas in the monitoring cell 12, such as a concentration meter or spectrograph.

By preventing fuel leaks, this system will minimize the leakage of fuel to the surrounding environment and hence is advantageous from a safety perspective. Further, through the use of sub-atmospheric fuel pressure, any failure of the fuel containment system, whether failure of plates, seals, endplates, or other components will result in flow of ambient gas into the fuel stream, rather than leakage of hydrogen-rich fuel out of the fuel cell stack.

In some embodiments, in response to an increase in concentration of diluent in the monitoring cell, a pump can be employed to exhaust the fuel stream from the fuel passage by withdrawing it from the stack until the concentration of diluent gases decreases. This embodiment would permit operation of the fuel cell on a fuel stream at a pressure below that of the surrounding environment during normal operation and during purging, further reducing leakage to the environment. In such an embodiment, the pressure control mechanism would not need a setting at which the fuel stream is supplied at a pressure above the pressure of the surrounding environment.

Preferably, the pressure control mechanism 2 (together with the controller 10 if present) controls the pressure of the fuel stream relative to the pressure of the surrounding environment. Therefore, it is advantageous to provide a pressure sensor 13 outside the fuel stack, to measure the pressure of the surrounding environment. The pressure sensor 13 may also be connected to provide a signal to the controller 10. The control mechanism 2 will then supply the fuel stream to the fuel cell stack either above or below this measurement in response to the desired action of the controller 10.

As shown in the schematic of FIG. 1, the pressure control mechanism 2 allows only sub-atmospheric fuel to enter the fuel cell system during normal operation.

In some embodiments, the pressure control mechanism 2 has at least two fuel stream pressure settings, for example sub-atmospheric and super-atmospheric. In normal operation and in response to a signal from the controller, the pressure control mechanism 2 (for example, a pressure regulator) maintains fuel at sub-atmospheric pressure. In response to a signal from the monitoring cell 12 to the controller 10 indicating the accumulation of a high concentration of diluent gases in the monitoring cell, a control signal activates the exhaust valve 9, for example a solenoid, and adjusts the spring compression within the regulator to modify its control pressure to super-atmospheric. In the event of an interruption in power to the regulator, the normal feed pressure would be sub-atmospheric.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings. For example, while the preceding description is directed to systems based on solid polymer electrolyte fuel cell stacks, a system may employ other types of fuel cells instead.

What is claimed is:

1. A fuel cell system comprising:
   a fuel cell stack adapted to operate on a fuel stream, the fuel cell stack comprising a fuel stream inlet that receives the fuel stream;
   a fuel supply for providing the fuel stream to the fuel cell stack;
   a pressure control mechanism for controlling the pressure of the fuel stream supplied to the fuel cell stack, wherein the pressure control mechanism is disposed between the fuel supply and the fuel stream inlet, and wherein the pressure control mechanism has a setting at which the fuel stream is supplied at a pressure below the pressure of the surrounding environment; and
   a monitoring device for monitoring a characteristic indicative of the concentration of a diluent in the fuel stream at a location in the fuel cell stack.

2. The fuel cell system of claim 1, wherein the pressure control mechanism does not have a setting at which the fuel stream is supplied at a pressure above the pressure of the surrounding environment.

3. The fuel cell system of claim 1, wherein the monitoring device is a device for monitoring the voltage of a monitored fuel cell.

4. The fuel cell system of claim 1, further comprising a purging mechanism for purging a diluent in the fuel stream from at least a portion of the fuel cell stack.

5. The fuel cell system of claim 1, wherein the pressure control mechanism comprises a purging setting at which the fuel stream is supplied at a pressure above the pressure of the surrounding environment.

6. The fuel cell system of claim 1, further comprising a controller for periodically adjusting the pressure control mechanism in response to the monitored characteristic.

7. The fuel cell system of claim 6, wherein the controller is programmed to adjust the pressure control mechanism to increase the pressure of the fuel stream supplied to the fuel cell stack in response to a control value of a monitored fuel cell.

8. The fuel cell system of claim 7, wherein the control value is a predetermined value.

9. The fuel cell system of claim 6, wherein the fuel cell stack further comprises a fuel stream outlet, and the controller is programmed to adjust the fuel stream outlet to exhaust the fuel stream from the fuel cell stack in response to a control value of the monitored characteristic.

10. The fuel cell system of claim 9, wherein the controller is programmed to adjust the pressure control mechanism and the fuel stream outlet substantially simultaneously in response to a control value of the monitored characteristic.

11. The fuel cell system of claim 1, wherein the pressure control mechanism has at least one sub-atmospheric pressure setting and at least one super-atmospheric pressure setting.

12. A fuel cell system comprising:
    a fuel cell stack adapted to operate on a fuel stream, the fuel cell stack comprising means for introducing the fuel stream to the fuel cell stack;
    a fuel supply for providing the fuel stream to the fuel cell stack through the fuel stream inlet;
    means for limiting the pressure of the fuel stream supplied to the fuel cell stack to a pressure below the pressure of the surrounding environment;
    means for monitoring the concentration of a diluent in at least a portion of the fuel cell stack; and
    means for selectively purging the diluent from at least a portion of the fuel cell stack in response to the means for monitoring.

13. The fuel cell system of claim 12, further comprising:
    means for occasionally purging the diluent from at least a portion of the fuel cell stack.

14. A method of operating a fuel cell adapted to operate on a fuel stream, the fuel cell comprising a fuel stream inlet and a diluent, the method comprising the steps of:
    providing to the fuel stream inlet a fuel stream at a pressure below the pressure of the surrounding environment;
    occasionally purging at least a portion of the fuel cell stack;
    monitoring a characteristic indicative of the concentration of the diluent within at least a portion of the fuel cell stack; and
    the occasional purging is in response to the monitored concentration.

15. The method of claim 14, wherein the step of occasionally purging comprises increasing the pressure of the fuel stream provided to the fuel stream inlet and permitting the fuel stream to exit the fuel cell.

16. The method of claim 15, wherein the fuel stream pressure is increased to a pressure greater than the pressure of the surrounding environment.

17. The method of claim 16, further comprising the step of returning the fuel stream to a pressure below the pressure of the surrounding environment in response to a monitored characteristic.

18. The method of claim 14, wherein the monitoring step comprises monitoring the voltage of a fuel cell in the fuel cell stack.

19. The method of claim 14, further comprising the step of measuring the pressure of the surrounding environment.

20. The method of claim 19, further comprising the step of adjusting the pressure of the fuel stream in response to the measured pressure of the surrounding environment.

21. The method of claim 14, wherein the purging step comprises withdrawing the contents of the portion of the fuel cell stack by operation of a vacuum pump.

22. A fuel cell system comprising:

a fuel cell stack adapted to operate on a fuel stream, the fuel cell stack comprising a fuel stream inlet that receives the fuel stream;

a fuel supply for providing the fuel stream to the fuel cell stack;

a pressure control mechanism for controlling the pressure of the fuel stream supplied to the fuel cell stack, wherein the pressure control mechanism is disposed between the fuel supply and the fuel stream inlet, and wherein the pressure control mechanism has a setting at which the fuel stream is supplied at a pressure below the pressure of the surrounding environment; and a pump operatively connected to the fuel cell stack for exhausting the fuel cell stream.

23. The fuel cell system of claim 22, wherein the pressure control mechanism does not have a setting at which the fuel stream is supplied at a pressure above the pressure of the surrounding environment.

24. The fuel cell system of claim 22, further comprising a monitoring device for monitoring a characteristic indicative of the concentration of a diluent in the fuel stream at a location in the fuel cell stack.

25. The fuel cell system of claim 22, wherein the monitoring device is a device for monitoring the voltage of a monitored fuel cell.

26. The fuel cell system of claim 22, further comprising a purging mechanism for purging a diluent in the fuel stream from at least a portion of the fuel cell stack.

27. The fuel cell system of claim 22, wherein the pressure control mechanism comprises a purging setting at which the fuel stream is supplied at a pressure above the pressure of the surrounding environment.

28. The fuel cell system of claim 22, further comprising a controller for periodically adjusting the pressure control mechanism in response to the monitored characteristic.

29. The fuel cell system of claim 22, wherein the controller is programmed to adjust the pressure control mechanism to increase the pressure of the fuel stream supplied to the fuel cell stack in response to a control value of a monitored fuel cell.

30. The fuel cell system of claim 22, wherein the control value is a predetermined value.

31. The fuel cell system of claim 22, wherein the fuel cell stack further comprises a fuel stream outlet, and the controller is programmed to adjust the fuel stream outlet to exhaust the fuel stream from the fuel cell stack in response to a control value of the monitored characteristic.

32. The fuel cell system of claim 22, wherein the controller is programmed to adjust the pressure control mechanism and the fuel stream outlet substantially simultaneously in response to a control value of the monitored characteristic.

33. The fuel cell system of claim 22, wherein the pressure control mechanism has at least one sub-atmospheric pressure setting and at least one super-atmospheric pressure setting.

* * * * *